US012697655B2

(12) United States Patent  
Eickhorst

(10) Patent No.: US 12,697,655 B2  
(45) Date of Patent: Aug. 4, 2026

(54) METHOD AND MACHINING SYSTEM FOR MACHINING AN AIRCRAFT STRUCTURAL COMPONENT

(71) Applicant: Broetje-Automation GmbH, Rastede (DE)

(72) Inventor: Dirk Eickhorst, Varel (DE)

(73) Assignee: Broetje-Automation Gmbh, Rastede (DE)

( * ) Notice: Subject to any disclaimer, the term of this patent is extended or adjusted under 35 U.S.C. 154(b) by 50 days.

(21) Appl. No.: 18/037,491

(22) PCT Filed: Nov. 24, 2021

(86) PCT No.: PCT/EP2021/082774  
§ 371 (c)(1),  
(2) Date: Nov. 2, 2023

(87) PCT Pub. No.: WO2022/112299  
PCT Pub. Date: Jun. 2, 2022

(65) Prior Publication Data  
US 2024/0253106 A1      Aug. 1, 2024

(30) Foreign Application Priority Data

Nov. 24, 2020     (DE) ..................... 10 2020 131 086.2

(51) Int. Cl.  
*B21J 15/14*        (2006.01)  
*B21J 15/28*        (2006.01)  
*G01B 11/25*        (2006.01)

(52) U.S. Cl.  
CPC .............. *B21J 15/142* (2013.01); *B21J 15/28* (2013.01); *G01B 11/2513* (2013.01)

(58) Field of Classification Search  
CPC .......... B21J 15/02; B21J 15/142; B21J 15/28; G01B 11/2513  
See application file for complete search history.

(56) References Cited

U.S. PATENT DOCUMENTS 6,154,279 A     11/2000   Thayer  
6,813,035 B2    11/2004   Hoffmann  
(Continued)

FOREIGN PATENT DOCUMENTS

DE      102014106312 A1 * 11/2015   ............. G01B 11/08  
DE      102017114971 A1 * 11/2018   ............. B21J 15/28  
WO         2022112299        6/2022

OTHER PUBLICATIONS

"German Search Report," for German Patent Application No. 10 2020 131 086.2 mailed Jun. 28, 2021 (8 pages).  
(Continued)

*Primary Examiner* — Christopher J. Besler  
(74) *Attorney, Agent, or Firm* — Pauly, DeVries Smith & Deffner LLC

(57)         ABSTRACT

Method for machining an aircraft structural component using a machining system, the machining system having a drilling unit and a riveting unit, a manufacturing process controller for actuating the components of the machining system, an optical sensor and a projection unit. The method comprising the steps of: projecting a pattern by the projection unit onto a machining point with a rivet element inserted into a drill hole of the machining point, detecting the machining point including the projection of the pattern by the sensor and generating corresponding detection data by the sensor, evaluating the detection data by an evaluation unit, adapting the tool control data for a drill hole to be drilled subsequently according to the manufacturing specification at a further machining point, in particular the countersink depth of the drill hole to be drilled, by the manufacturing process controller on the basis of the evaluation of the detection data.

17 Claims, 5 Drawing Sheets

(56)  References Cited

U.S. PATENT DOCUMENTS

Figure 1:
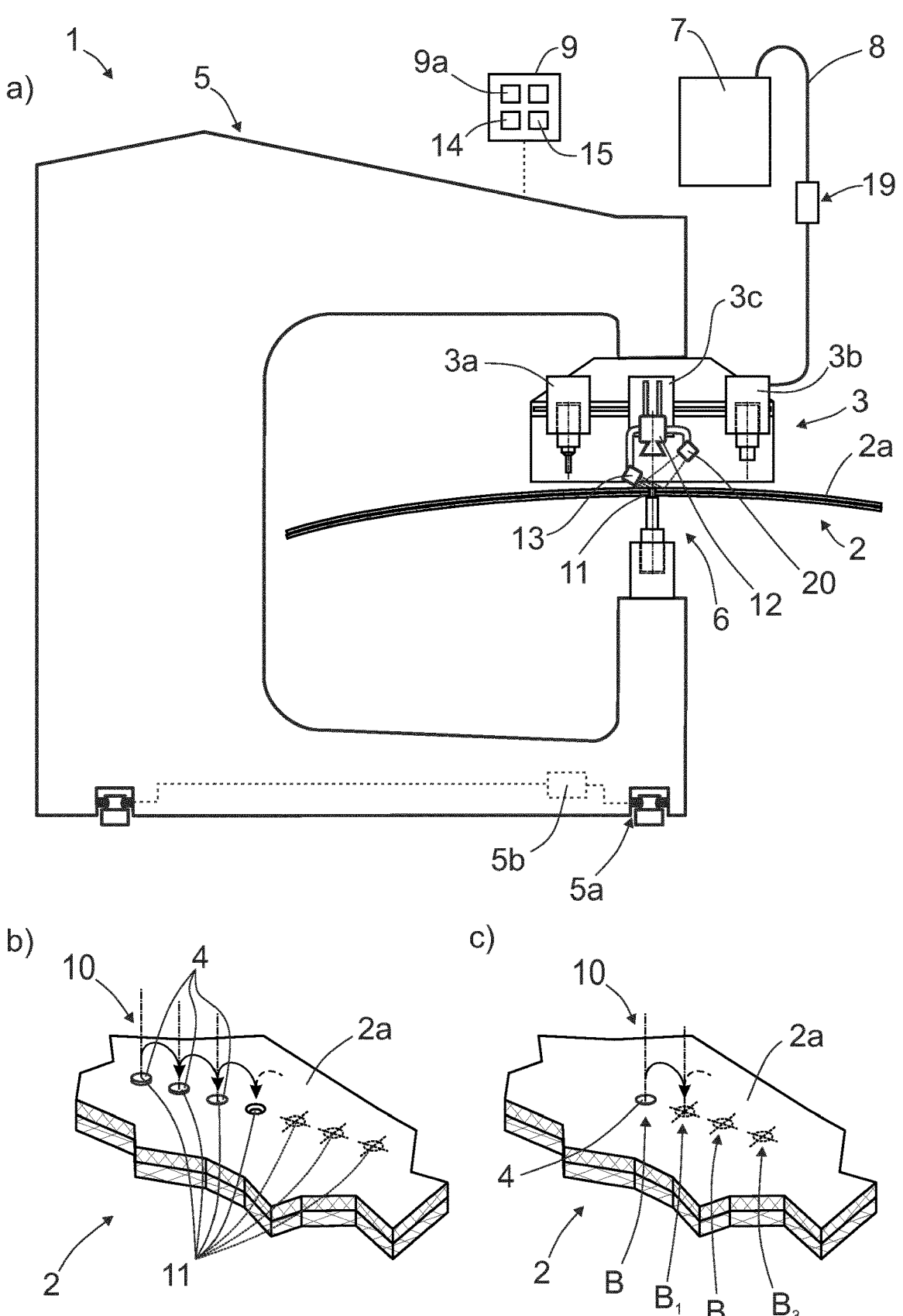

| | | | |
|---|---|---|---|
| 9,410,895 | B2 | 8/2016 | Kilibarda et al. |
| 9,579,712 | B2 | 2/2017 | Schneider et al. |
| 11,014,212 | B2 | 5/2021 | Ficken et al. |
| 11,167,339 | B2 | 11/2021 | Eusterwiemann |
| 11,338,355 | B2 | 5/2022 | Ficken et al. |
| 2014/0095107 | A1 | 4/2014 | Haisty et al. |
| 2014/0259600 | A1* | 9/2014 | Kilibarda ............... G01N 21/84 |
| | | | 29/407.04 |
| 2017/0056960 | A1* | 3/2017 | Ficken .................... B21J 15/32 |
| 2020/0282449 | A1* | 9/2020 | Eusterwiemann .... B23P 19/004 |
| 2021/0325313 | A1 | 10/2021 | Kasavala et al. |

OTHER PUBLICATIONS

"International Search Report and Written Opinion," for PCT Application No. PCT/EP2021/082774 mailed Apr. 5, 2022 (16 pages).

\* cited by examiner a)

b)

a)

b)

c)

1

METHOD AND MACHINING SYSTEM FOR MACHINING AN AIRCRAFT STRUCTURAL COMPONENT

CROSS-REFERENCE TO RELATED APPLICATIONS

This application is a national stage application under 35 U.S.C. 371 of International Patent Application Serial No. PCT/EP2021/082774, entitled "Method and Machining System for Machining an Aircraft Structural Component," filed Nov. 24, 2021, which claims priority from German Patent Application No. DE 10 2020 131 086.2, filed Nov. 24, 2020, the disclosure of which is incorporated herein by reference.

FIELD OF THE TECHNOLOGY

Various embodiments relate to a method for machining an aircraft structural component and a machining system for machining an aircraft structural component.

BACKGROUND

Various machining systems for aircraft structural components are known from the prior art. These also include so-called drilling and riveting machines, with which aircraft structural components can be drilled and riveted.

Such machining systems generally have an end effector having a drilling unit and having a riveting unit, which execute a series of drilling procedures and riveting procedures according to a manufacturing specification when machining the aircraft structural component.

In aircraft construction, particularly high demands are placed on the rivet connections. Therefore, precise matching of the holes and the rivet elements inserted therein is required to satisfy strict tolerance specifications. The rivet elements must generally have no, or only a very slight, head projection. The head of a rivet element must therefore protrude only very slightly with respect to the surface of the aircraft structural component.

If the head projection is too great, the rivet elements must be removed from the holes and replaced by new rivet elements. This generally takes place manually after the machining by the machining system. This subsequent work is very cost and labor intensive.

To reduce the number of rivet connections on an aircraft structural component which require subsequent work, it is usual to measure the drilled hole after drilling and, in particular, to check the countersink depth of the drilled hole. The measurement of a drilled hole using a measuring lance is described, for example, in DE 10 2014 108 629 A1.

EP 2 766 135 B1 likewise describes obtaining geometrical data of a drilled hole. It proposes detecting a drilled hole from above with a camera and, based on the countersink diameter of the drilled hole and the hole diameter of the drilled hole and the countersink angle of the drilled hole, correcting the tool control data for a countersink depth of a hole which is to be subsequently formed.

A measuring method for measuring holes and heads of rivet elements is furthermore known from U.S. Pat. No. 6,154,279.

Although many attempts have already been made in the past to reduce the number of rivet connections which are outside the tolerance in aircraft structural components, such rivet connections still occur. These have to be laboriously removed and replaced.

2

SUMMARY

Various embodiments are based on the problem of further improving the manufacture of aircraft structural components which is known per se to the extent that fewer rivet connections which are outside the tolerance are produced during manufacture and the subsequent work effort and the manufacturing costs are therefore reduced.

The above problem is solved by various embodiments disclosed herein.

A key aspect here is the idea of projecting a pattern onto the machining point with a rivet element inserted into the drilled hole and detecting the projected pattern on the machining point using the sensor. The analysis of the projection of the pattern enables the sum of the tolerance of the generated drilled hole and the tolerance of the currently used batch of rivet elements to be evaluated with regard to the rivet connection which is, or will be, generated and the hole of the drilled hole to be automatically adapted at the further machining point. This adaptation takes place based on the analysis of the detection data by adapting the tool control data. This minimizes the likelihood of a sum of the tolerance of the rivet element and the tolerance of the hole being outside the tolerance range of the rivet connection at the further machining point.

In detail, a method for machining an aircraft structural component using a machining system is proposed, wherein the machining system has a drilling unit and a riveting unit, wherein a manufacturing process control for activating the components of the machining system is provided, wherein the manufacturing process control executes a series of drilling procedures by means of the drilling unit and riveting procedures by means of the riveting unit based on tool control data according to a manufacturing specification, wherein the machining system has an optical sensor and a projection unit and wherein the method comprises the steps:

projecting a pattern, using the projection unit, onto a machining point with a rivet element inserted into a drilled hole of the machining point, detecting the machining point, including the projection of the pattern, using the sensor and generating corresponding detection data by means of the sensor, analyzing the detection data by means of an analysis unit, adapting the tool control data for a drilled hole which is to be subsequently drilled according to the manufacturing specification at a further machining point—in particular the countersink depth of the drilled hole which is to be drilled—by means of the manufacturing process control based on the analysis of the detection data.

According to various embodiments, the head projection of a rivet element and/or an angled position of the rivet element is determined during the analysis. Based on this analysis, the countersink depth can be adapted in the tool control data for the drilled hole which is to be subsequently drilled. This precise determination of the position of the rivet element in the drilled hole enables particularly precise readjustment of the countersink depth for the following drilled hole.

Various configurations of the projected pattern are provided herein. These enable particularly precise identification of the position and/or alignment of the rivet element in the drilled hole with regard to the head projection and/or angled position.

Various methods for determining the head projection and angled position of the rivet element in the drilled hole are described herein.

Various embodiments provide arrangements of the projection unit and the sensor with respect to one another and in relation to the drilled hole of the machining point and enable particularly dependable and reliable detection of the machining point with the rivet element in the drilled hole.

The analysis and the adaptation can be based on detection data, which are generated when the rivet element is inserted and the rivet connection is not yet produced and/or which are generated when the rivet element is inserted and the rivet connection is already produced. The advantage of the analysis and adaptation taking place when the rivet element is inserted but the rivet connection is not yet produced lies in the simple removal of the rivet element in the event that a tolerance deviation is ascertained or expected. The analysis and adaptation of an inserted rivet element with a rivet connection which is already produced enables a final assessment as to whether tolerances are satisfied, since the position between the rivet element and the aircraft structural component, as well as the position of the rivet element in the aircraft structural component, is already established.

Various embodiments provide a measuring device for measuring the rivet elements and describe how, additionally, the adaptation of the tool control data can be further improved on the basis of the measurement of the rivet elements.

In various embodiments, the method is repeated at the further machining point as a new machining point and the tool data can be adapted for a machining point following this new machining point. This enables continuous optimization of the tool control data for the drilling procedure.

According to various embodiments, the method can be carried out at the further machining point in particular when a rivet element from a new batch is to be inserted into the drilled hole at this machining point. Since the change in the rivet-element tolerance is greater for rivet elements from a different batch than it is for rivet elements from the same batch, it is particularly important in this case to repeat the method for following rivet elements which then also come from this new batch.

Various embodiments provide a machining system for machining an aircraft structural component. The machining system has a drilling unit, a riveting unit, a manufacturing process control for activating the components of the machining system, an optical sensor and a projection unit. It is proposed that the machining system be designed and configured for machining an aircraft structural component according to the method described above. All embodiments relating to the proposed method may be referred to with regard to the machining system.

Various embodiments provide a method for machining an aircraft structural component using a machining system, wherein the machining system has a drilling unit and a riveting unit, wherein a manufacturing process control for activating the components of the machining system is provided, wherein the manufacturing process control executes a series of drilling procedures by means of the drilling unit and riveting procedures by means of the riveting unit based on tool control data according to a manufacturing specification, wherein the manufacturing system has an optical sensor and a projection unit, wherein the method comprises the steps: projecting a pattern, using the projection unit, onto a machining point with a rivet element inserted into a drilled hole of the machining point, detecting the machining point, including the projection of the pattern, using the sensor and generating corresponding detection data by the sensor, analyzing the detection data by an analysis unit, adapting the tool control data for a drilled hole which is to be subsequently drilled according to the manufacturing specification at a further machining point B1—in particular the countersink depth of the drilled hole to be drilled—by the manufacturing process control based on the analysis of the detection data.

In various embodiments, a head projection of the rivet element is determined during the analysis, and/or in that an angled position of the rivet element is determined during the analysis, in some embodiments, in that, based on this analysis, the countersink depth is adapted in the tool control data for the drilled hole which is to be subsequently drilled.

In various embodiments, the pattern comprises at least one stripe, such as in that the pattern is a striped projection having at least two or at least three, in particular parallel, stripes.

In various embodiments, at least one stripe is wider or narrower than the other stripe(s) and/or a mutual distance between the stripes differs.

In various embodiments, the pattern consists exclusively of parallel stripes or in that the pattern consists of a predetermined point cloud or in that the pattern is a grid pattern, such as in that the grid pattern consists of polygons, in particular triangles and/or squares.

In various embodiments, at the machining point, the head projection is determined by identifying an offset of the pattern, in particular of one or more stripes of the pattern, on the head of the rivet element in relation to the pattern on the aircraft structural component at the machining point or with respect to a reference.

In various embodiments, at the machining point, an angled position of the rivet element can be determined by identifying a rotation of the pattern on the head of the rivet element with respect to the pattern on the aircraft structural component at the machining point or with respect to a reference and/or by identifying a compression or elongation of the pattern on the head of the rivet element in relation to the pattern on the aircraft structural component at the machining point or with respect to a reference.

In various embodiments, during the detection of the machining point, the projection unit and the sensor are directed onto this machining point at an angle to one another, such as in that this angle is between 20° and 90°, between 45° and 75°, between 55° and 65°, or is in particular substantially 60°.

In various embodiments, during the detection, the projection unit is directed onto the machining point at an angle in relation to the longitudinal axis of the drilled hole, such as in that the angle between the direction of the projection by the projection unit and the longitudinal axis of the drilled hole is between 45° and 75°, between 55° and 65°, or is in particular substantially 60°.

In various embodiments, during the detection, the sensor is directed onto the machining point from above, in particular orthogonally.

In various embodiments, the analysis and the adaptation is based on detection data which are generated when the rivet element is inserted and the rivet connection is not yet produced, and/or in that the analysis and the adaptation is based on detection data which are generated when the rivet element is inserted and the rivet connection is already produced.

In various embodiments, a measuring device for measuring the rivet elements before their insertion into the drilled holes is provided and in that the tool control data for the drilled hole which is to be subsequently drilled according to the manufacturing specification at the further machining point is additionally also adapted based on the measurement of the rivet element which is to be positioned in this drilled hole.

In various embodiments, the rivet element inserted into the drilled hole of the machining point has also been measured by the measuring device before its insertion and in that the tool control data for the drilled hole which is to be subsequently drilled according to the manufacturing specification at the further machining point are additionally also adapted based on the measurement of the rivet element inserted into the drilled hole of the machining point.

In various embodiments, the method is repeated at the further machining point as a new machining point and the machine tool data are adapted for a machining point following this new machining point.

In various embodiments, the manufacturing process control detects whether the rivet element which is to be positioned at the further machining point belongs to the same batch as the rivet element inserted at the machining point or whether it belongs to a new batch, such as in that, if the rivet element which is to be inserted at the further machining point belongs to a new batch, the method is repeated at the further machining point as a new machining point and the tool control data are adapted for a machining point following this new machining point.

Various embodiments provide a machining system for machining an aircraft structural component, wherein the machining system has a drilling unit, a riveting unit, a manufacturing process control for activating the components of the machining system, an optical sensor and a projection unit, wherein the machining system for machining an aircraft structural component is designed and configured according to the method as described herein.

DETAILED DESCRIPTION

Figure 2:
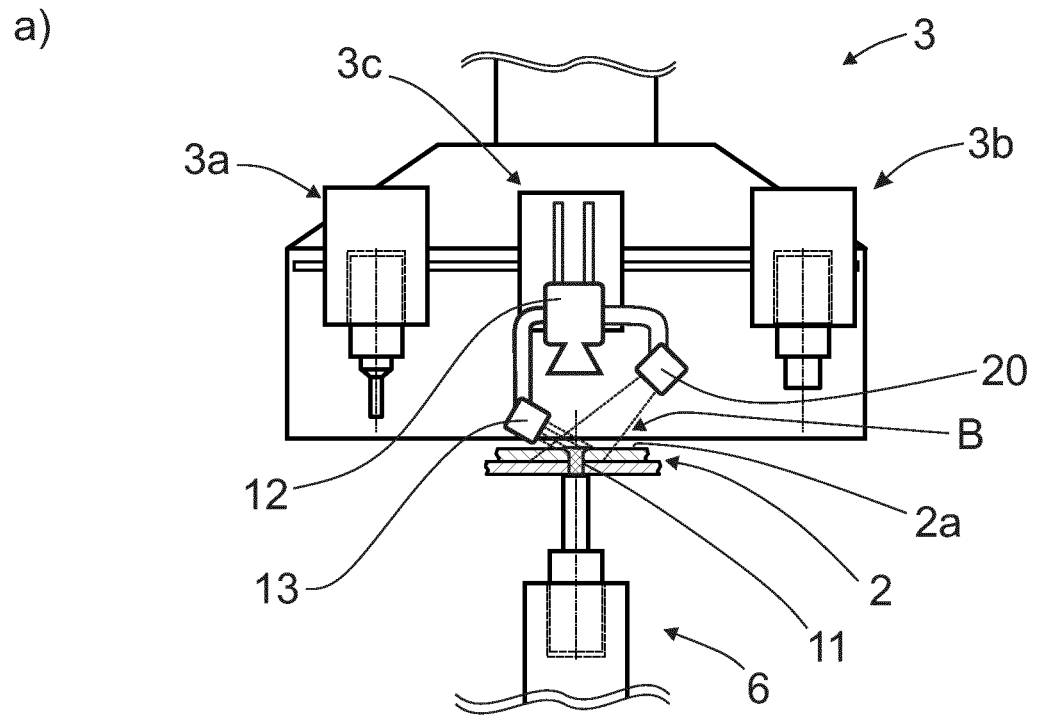
Figure 2:
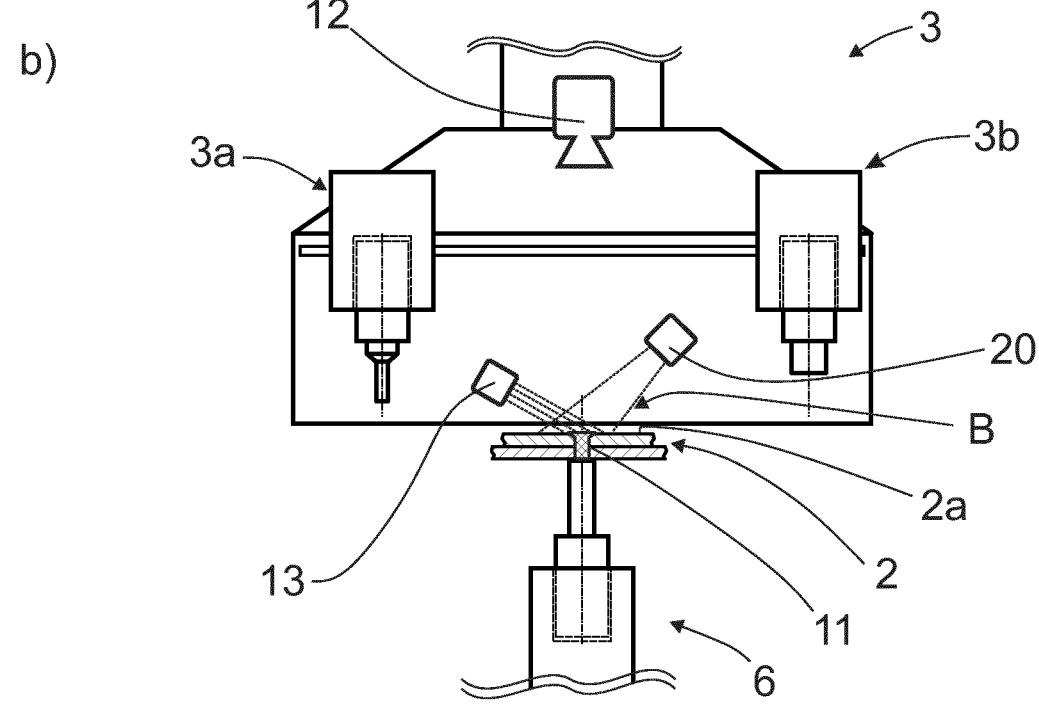
Figure 3:
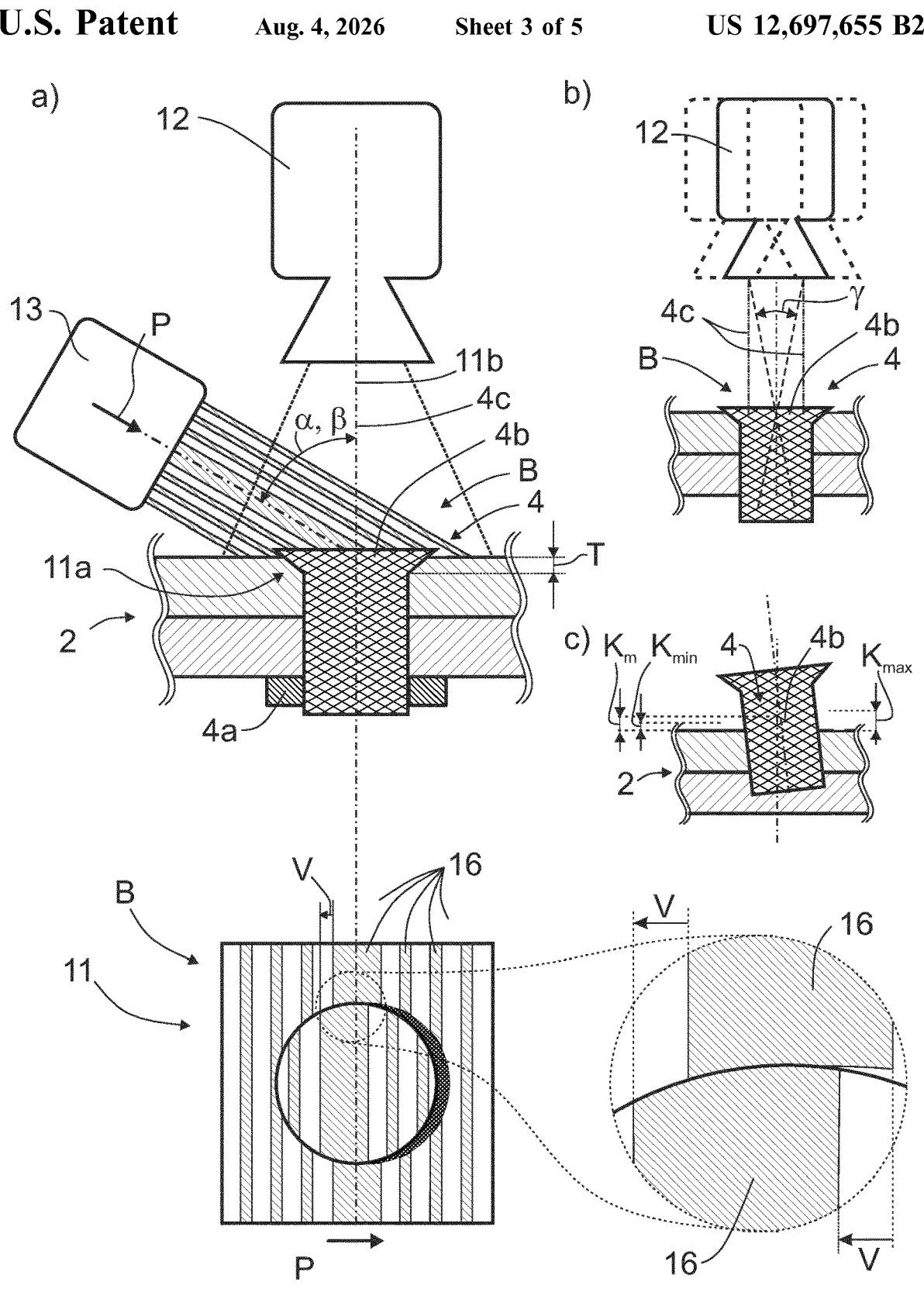
Figure 4:
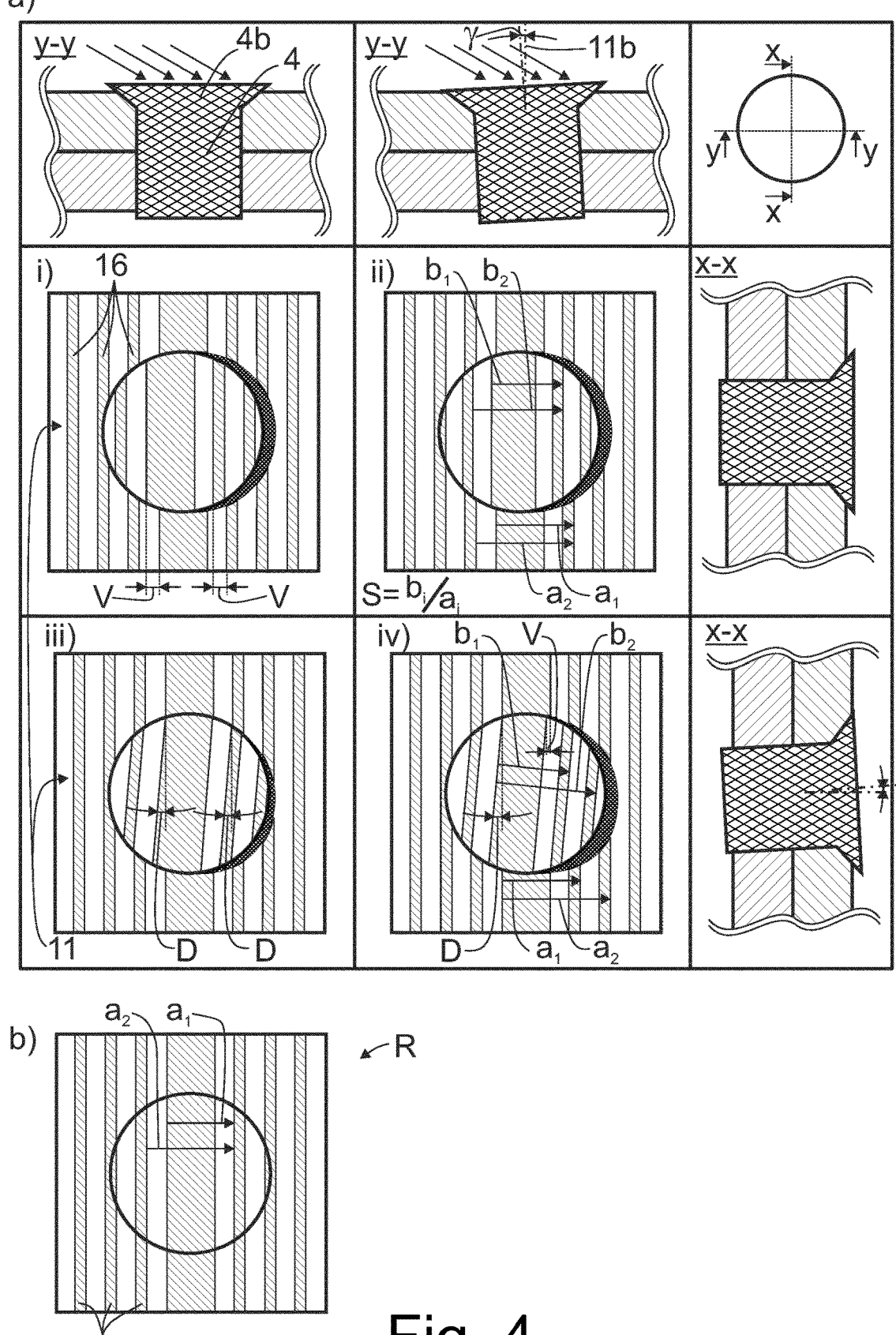
Figure 5:
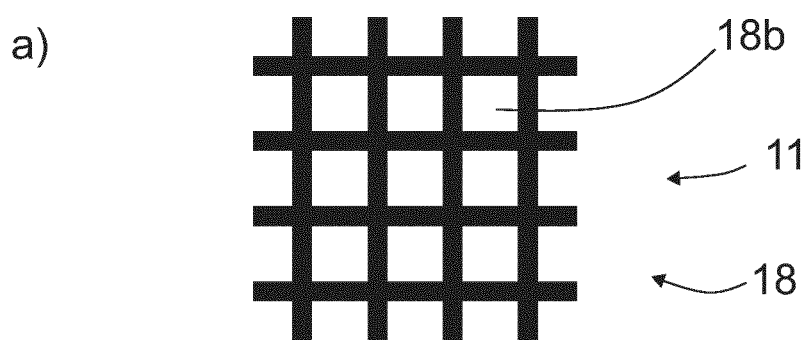
Figure 5:
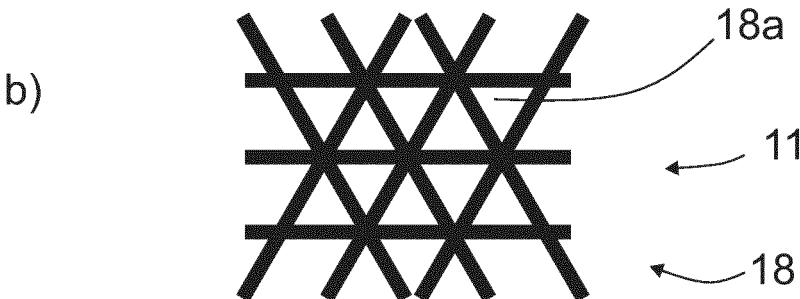
Figure 5:
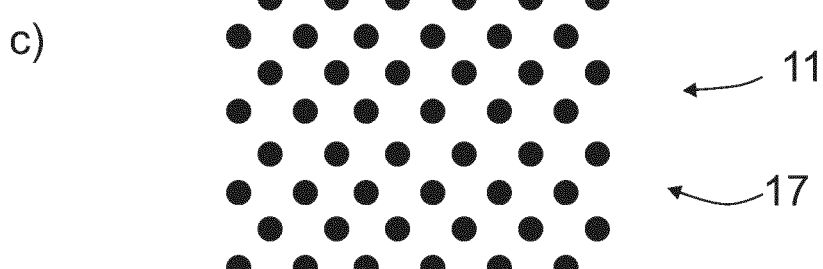

Various aspects are explained in more detail below with reference to a drawing, which merely illustrates exemplary embodiments. In the drawing:

FIG. 1 shows a proposed machining system for machining an aircraft structural component and for carrying out a proposed method, FIG. 2a) shows the end effector of the machining system according to FIG. 1 and b) shows a second exemplary embodiment of an end effector of a machining system, FIG. 3 shows a schematic illustration of the projection, detection and analysis, FIG. 4 shows a schematic illustration for different positions of the rivet element which can be established in the aircraft structural component and how these can be detected and analyzed using the proposed method in order to adapt the tool control data, and FIG. 5 shows various exemplary embodiments of a pattern which can be projected onto the machining point in order to carry out the method.

DETAILED DESCRIPTION

The proposed machining system 1 serves to machine an aircraft structural component 2. Aircraft structural components 2 here are, in particular, structural components of a fuselage or a wing for an aircraft. They can have a plurality of material layers which are connected to one another by the machining system 1. In the exemplary embodiment, the machining system 1 is designed for drilling and riveting the aircraft structural component 2. Accordingly, the machining system 1 has a drilling unit 3a for generating holes in the aircraft structural component 2 and a riveting unit 3b for inserting rivet elements 4, in particular countersunk rivet elements, into the generated drilled holes and to produce the rivet connection. By producing the rivet connection, the material layers of the aircraft structural component 2 are connected to one another.

In various embodiments, the machining system 1 has an end effector 3 and the drilling unit 3a and the riveting unit 3b are part of the end effector 3. These can be moved into an active working position or into a parked position on the end effector 3 depending on the particular machining to be carried out by the end effector 3. This can take place, for example, via a linear displacement of the drilling unit 3a and/or the riveting unit 3b or, for example, also by means of a turret arrangement.

Here, the end effector 3 can be supported by an adjusting unit 5 for the end effector 3. The adjusting unit 5 can have a plurality of adjustment axes 5a, so that, for machining different machining points, the end effector 3 can be displaced relative to the aircraft structural component 2 to be machined.

Furthermore, the machining system 1 can have a second end effector 6, as in the exemplary embodiment. Here, during the machining of the aircraft structural component 2, the second end effector 6 is arranged on the opposite side of the aircraft structural component to the end effector 3. It is involved in producing the rivet connection and, in this regard, forms a counter-tool to the tool of the end effector 3. In this regard, the second end effector 6 forms a tool pair together with the end effector 3.

In the exemplary embodiment, the riveting unit 3b on the end effector 3 positions the rivet element and the second end effector 6 produces the rivet connection. This takes place by screwing a so-called rivet collar 4a onto the rivet element 4 here.

In various embodiments, the second end effector 6 is adjusted by the adjusting unit 5 for the end effector 3. This is illustrated in FIG. 1. However, the second end effector can also have a separate adjusting unit.

Here, the machining system 1 furthermore has a rivet store 7. The rivet store 7 is arranged separately from the end effector 3, in particular separately from the adjusting unit 5 of the machining system. Here, the rivet elements 4 are delivered from the rivet store 7 to the end effector 3 through a delivery tube 8.

A manufacturing process control 9 is furthermore provided. Here, the machining system 1 has the manufacturing process control 9. By activating the components of the machining system 1 according to a manufacturing specification 10, it executes a series of drilling procedures by means of the drilling unit 3a and riveting procedures by means of the riveting unit 3b based on tool control data 9b. The components comprise, for example, the drives 5b of the adjusting unit 5 for adjusting the end effector(s) 3, 6 and the adjusting units for the adjustment thereof.

Here, the manufacturing process control 9 can be a central control. However, it is also conceivable for the manufacturing process control to be arranged in a decentralized, i.e. distributed, manner. In particular, the manufacturing process control can be an NC for the machining system 1.

An example of a manufacturing specification 10 is the sequential drilling and riveting of the drilled holes 11, which are arranged in a row in FIG. 1b). Individual drilled holes 11 here already contain rivet elements 4, whilst one drilled hole 11 is not yet fitted with a rivet element 4 and drilled holes 11 which are yet to be produced are shown by dot and dash lines.

The proposed machining system 1 furthermore has an optical sensor 12 and a projection unit 13. The optical sensor 12 here is a camera. In various embodiments, the optical sensor 12 and the projection unit 13 are part of the end effector 3 and are arranged thereon. In particular, the optical sensor 12 can be arranged in a fixed manner on the end effector 3, as shown in FIG. 2b). Provision can be made for the riveting unit 3b to be moved out of a working position in order to detect the machining point B by means of the sensor 12. This can give the sensor 11 a clear view of the machining point B.

Alternatively, however, the optical sensor 12 can also be arranged in a movable manner on the end effector 3. For example, as shown in FIG. 2a), the optical sensor 12 can be part of a sensor unit 3c, which is arranged in an adjustable manner on the end effector 3. In particular, the sensor unit 3c, like the drilling unit 3a and the riveting unit 3b, can be arranged in an adjustable manner on the end effector 3 and one of the units 3a, 3b, 3c in each case can be displaced into an active position. The drilling unit 3a, the riveting unit 3b and the sensor unit 3c can be linearly displaceable on the end effector 3 and/or received in a turret.

Here, when executing a manufacturing specification of drilling procedures by means of the drilling unit 3a and riveting procedures by means of the riveting unit 3b based on tool control data 9a, the following method is carried out:

Projecting a pattern M onto a machining point B with a rivet element 4 inserted into a drilled hole 11 of the machining point B. The projection here is realized by means of the projection unit 13. Detecting the machining point B, including the projection of the pattern M, using the optical sensor 12 and generating corresponding detection data 14 by means of the sensor 12.

The detection data 14 are then analyzed. The analysis can be performed by an analysis unit 15, which can further be associated with the manufacturing process control 9 and/or is part of the manufacturing process control 9.

Adapting the tool control data 9a for a drilled hole 11 which is to be subsequently drilled according to the manufacturing specification 10 at a further machining point $B_1$ based on the analysis of the detection data 14. This is realized by the manufacturing process control 9 here.

Owing to the projection, detection and analysis, the quality of the rivet connection at the machining point B or the expected quality of the rivet connection at the machining point B is assessed. This enables the tool control data 9a for a drilled hole 11 which is to be subsequently drilled at a further machining point $B_1$ to be adapted in a particularly precise manner so that a rivet connection in the tolerance range is generated with greater certainty at the further machining point $B_1$. The proposed method not only enables automated quality assessment of the rivet connection at the machining point B, but also automated optimization of the drilling procedure at a further machining point $B_1$ and therefore of the rivet connection at this further machining point $B_1$. The manufacturing process control 9 can adapt the tool control data 9a autonomously, that is to say without intervention by an operator, based on the detection and analysis. Here, this further machining point $B_1$ can be the machining point $B_1$ which directly follows the machining point B according to the manufacturing specification 10.

Before the proposed method is carried out, the drilling unit 3a of the end effector 3 can have also drilled the drilled hole 11 at the machining point B according to the manufacturing specification 10 and the riveting unit 3b has inserted the rivet element 4 into the drilled hole 11.

It is particularly advantageous if a head projection K of the rivet element 4 is determined during the analysis and/or an angled position of the rivet element 4 is determined during the analysis. The angled position of the rivet element 4 here is the inclination of the longitudinal axis of the rivet element 4 relative to the longitudinal axis 11b of the drilled hole. Here, the countersink depth T for the drilled hole 11 which is to be subsequently drilled is adapted in the tool control data 9a based on this analysis and determination of the head projection K and/or angled position S. It is pointed out here that the head projection K can be a positive head projection in the sense that the head 4b of the rivet element 4 protrudes with respect to the surface of the aircraft structural component 2 at the machining point B or a negative head projection K, in which case the head 4b of the rivet element 4 does not project out of a countersink region 11a of the drilled hole 11. Additionally or alternatively, it is also possible that a plurality of head projections K are identified for a single rivet element 4. This can be a maximum head projection $K_{max}$, for example, which is understood to refer to the distance of the furthest-protruding point of the rivet element with respect to the aircraft structural component surface 2a, or a minimum head projection $K_{min}$, which is understood to refer to a head part of the rivet element 4 which protrudes the least with respect to the aircraft structural component surface 2a, and/or a mean head projection $K_m$ can be identified, which is understood to refer to the distance between the aircraft structural component surface 2a and the head end 4b in relation to the longitudinal axis 4c of the rivet element 4. This is shown in FIG. 3b).

Additionally or alternatively, the adaptation of the tool control data 9a for the drilled hole 11 which is to be subsequently drilled at the further machining point $B_1$ can also take place based on the analysis of one, two or all three of these specific head projections $K_{max}$, $K_{min}$, $K_m$.

To be able to precisely determine the head projection K and/or the angled position of the rivet element 4 with respect to the aircraft structural component 2, special configurations of the pattern M can be provided. A striped projection, as shown in FIGS. 3 and 4, can be used.

The pattern M can have at least one stripe 16. In particular, the pattern M can be a striped projection with at least two or at least three, in particular parallel, stripes 16. Such a pattern M is shown in FIG. 3. Here, at least one stripe 16 is wider or narrower than the other stripe(s) and/or a mutual distance between the stripes 16 differs. If this is the case, provided the projection direction—the direction from which the projection unit 13 provides the machining point B with the projection—is known, it is also possible to ascertain from the projection whether the rivet element 4 is poking out, or is countersunk, with respect to the aircraft structural component 2 at the machining point B. It can additionally be checked whether at least portions of a countersink diameter of the drilled hole can be optically detected by the sensor 12 despite the rivet element 4 being inserted. If this is the case, a negative head projection K is present at least in this region. The analysis unit 15 can thus carry out a plausibility check.

Alternative patterns 5 are shown in the exemplary embodiment of FIG. 5. The pattern M can consist exclusively of parallel stripes 16, for example, or the pattern M can consist of a predetermined point cloud 17, or the pattern M can be a grid pattern 18. The grid pattern 18 can then be composed of polygons, in particular triangles 18a or squares 18b, as shown in FIG. 5.

The manner in which the head projection K and/or the angled position S of the rivet element 4 is determined using the projected pattern M shall be briefly described below with reference to FIGS. 3 and 4.

FIG. 3 shows a schematic view of the machining point B with a rivet element 4 inserted into the drilled hole 11. The longitudinal axes 4c, 11b of the rivet element 4 and the drilled hole 11 are coaxial here.

The projection unit 13 projects a pattern M onto the machining point B from the side. This machining point is formed by the inserted rivet element 4 and a portion of the aircraft structural component 2 which extends around the drilled hole 11 containing the inserted rivet element 4. The head 4b of the rivet element 4 protrudes somewhat with respect to the aircraft structural component surface of the rivet element 4. As shown by the view from above, the projection of the pattern M on the aircraft structural component surface differs from that on the head 4b of the rivet element 4. This is due to the different height—the head projection K here—of the rivet element 4.

The head projection K can be determined by identifying an offset of the pattern M on the head 4b of the rivet element 4 in relation to the pattern M on the aircraft structural component 2 at the machining point B and/or with respect to a reference R. In the exemplary embodiment, the offset V of one or more stripes 16 of the pattern M is determined for this purpose. This is additionally also shown in FIG. 4 a) i). The reference R can be a detected reference which, in particular, has also been recorded by the sensor 12 within the context of a calibration procedure, and/or it can be a reference model which has been generated for this purpose. Such a reference is shown in FIG. 4b).

Additionally or alternatively, at the machining point B, an angled position of the rivet element 4 can be determined by identifying a rotation D of the pattern M on the head 4b of the rivet element 4 with respect to the pattern M on the aircraft structural component 2 at the machining point B and/or with respect to a or the reference R and/or by identifying a compression or elongation S of the pattern M on the head 4b of the rivet element 4 in relation to the pattern M on the aircraft structural component 2 at the machining point B and/or with respect to a or the reference R. This can take place, for example, by identifying the ratio of the distance b between the lines on the head of the rivet element to the distance a between the lines on the aircraft structural component 2 at the machining point B. The reference R can be a detected reference which, in particular, has also been recorded by the sensor 12 within the context of a calibration procedure, and/or it can be a reference model which has been generated for this purpose. In particular, this is the same detected reference and/or the same reference model as that for identifying the head projection K.

In a view from above, the angled position in the direction of the projection P can be determined by identifying a compression or elongation S of the pattern M on the head 4b of the rivet element 4 in relation to the pattern M on the aircraft structural component 2 at the machining point B and/or with respect to the reference R. In FIG. 4 a), this is shown in ii). The compression or elongation S here is identified by the ratio of the distances a, b between stripes 16 on the rivet element 4 to those on the aircraft structural component 2.

The angled position transverse to the direction of the projection P can be identified by identifying a rotation D of the pattern M on the head 4b of the rivet element 4 with respect to the pattern M on the aircraft structural component 2 at the machining point B and/or with respect to the reference R. This is shown in iii) in FIG. 4a). The rotation D of the stripes 16 on the head 4b of the rivet element 4 with respect to the stripes on the aircraft structural component 2 is identified here.

With a superposition of the head projection K and angled position, in particular in the direction of the projection P and transverse to the direction of the projection P, as illustrated in iv) in FIG. 4a), both the offset V, the compression or elongation S and the rotation V can be used to adapt the tool control data 9a.

During the detection of the machining point B, the projection unit 13 and the sensor 12 are directed onto this machining point at an angle α. This is shown in FIGS. 1 to 3. The angle α is formed between the optical axis 16 of the sensor 12 and the direction of the projection P by the projection unit 13. This angle α can be between 20° and 90°, between 45° and 75°, between 55° and 65°, or can be substantially 60°.

In relation to the longitudinal axis of the drilled hole 11b, the projection unit 13 can be directed onto the machining point at an angle. The angle β between the direction of the projection P by the projection unit and the longitudinal axis 11b of the drilled hole 11 can be between 45° and 75°, between 55° and 65°, or can be substantially 60°. The distance of the projection unit 13 from the drilled hole 11 during the detection can be a maximum of 30 cm, a maximum of 20 cm, or a maximum of 15 cm.

During the detection, the sensor 12 here is directed onto the machining point B from above, in particularly orthogonally. During the detection, the sensor 12, in particular the point of the sensor 12 at which its optical axis 4c emerges therefrom, can be arranged in a cone whereof the center axis is coaxial to the longitudinal axis 11b of the drilled hole and whereof the cone tip lies on the (theoretical) surface of the aircraft structural component 2 before the hole 11 is drilled and whereof the cone angle (γ) can be smaller than or equal to 10°, smaller than or equal to 5°, or smaller than or equal to 2°. This is shown in FIG. 3b). In the exemplary embodiment, the optical axis of the sensor 12 and the longitudinal axis 11b of the drilled hole 11 are substantially coaxial.

The analysis and adaptation can be based on detection data, which are generated when the rivet element 4 is inserted but the rivet connection is not yet produced. In this way, tolerances of both the rivet element 4 and the drilled hole 11, in particular resulting from wear on the drill, can be taken into account for the adaptation of the tool control data 9a. This moreover has the advantage that the rivet element 4 can be simply removed from the drilled hole 11.

Additionally or alternatively, provision can be made for the analysis and the adaptation to be based on detection data which are generated when the rivet element 4 is inserted and the rivet connection is already produced. In this case, positioning procedures required for the rivet connection can also be taken into account for the adaptation of the tool control data 9a. In the exemplary embodiment of FIG. 3a, the rivet connection is produced. A rivet collar 4a has been screwed onto the rivet element 4 by the second end effector 6 here.

The tool control data 9a for the drilled hole 11 which is to be subsequently drilled according to the manufacturing specification 10 at the further machining point B₁ are additionally also adapted based on the measurement of the rivet element 4 to be positioned in this drilled hole 11. As shown in FIG. 1, for this purpose a measuring device 19 for measuring the rivet elements 4 before their insertion into the drilled holes 11 can be provided. In the exemplary embodiment, the measuring device 19 is provided in the delivery tube 8 of the rivet store 8 for the end effector 3. Such a measuring device 19 can be designed, for example, as in DE 10 2014 106 312 A1.

Additionally or alternatively, provision can be made for the rivet element 4 which is inserted into the drilled hole of the machining point B to also have been measured by the measuring device 19 before insertion and for the tool control data 9a for the drilled hole 11 which is to be subsequently drilled according to the manufacturing specification 10 at the further machining point B to additionally also be adapted based on the measurement of the rivet element 4 inserted into the drilled hole 11 of the machining point B.

The proposed method, possibly including the further proposed configuration, can be repeated at the further machining point B as a new machining point $B_1$. The tool control data 9a are then adapted for a machining point $B_2$ following this new machining point $B_1$. Alternatively, provision can also be made for the projection, detection and analysis with the subsequent adaption of the tool control data to be repeated after a predetermined number of holes, in particular every 5 or 10 holes of a manufacturing specification.

Moreover, provision can be made for the manufacturing process control 9 to detect whether the rivet element 4 which is to be positioned at the further machining point $B_1$ belongs to the same batch as the rivet element 4 inserted at the machining point B or whether it belongs to a new batch, such as to repeat the method at the further machining point $B_1$ as a new machining point B if the rivet element 4 which is to be inserted at the further machining point $B_1$ belongs to a new batch and to adapt the tool control data 9a for a machining point $B_2$ following this new machining point $B_1$.

Provision may be made here for the method to not be carried out for each of the further machining points $B_1$ if the rivet elements 4 which are to be inserted into the drilled holes 11 of these further machining points B belong to the same batch as the rivet element 4 inserted at the machining point B.

A measurement of the rivet elements 4 can take place, for example, in the measuring device described above and/or when the rivet elements 4 are filled or sorted into a rivet store 7. This measurement can be used to determine which rivet elements 4 belong to one batch, for example.

Provision can moreover be made for a pattern, in particular the pattern M, to be projected onto the machining point B by means of the projection unit 13 at the machining point B before the insertion of the rivet element 4 into the drilled hole 11 and for the machining point B with the drilled hole 11 without the inserted rivet element 4, including the projection of the pattern M, to be detected by a sensor, in particular the sensor 12. Additionally, the drilled hole 11 of the machining point B can therefore also be analyzed using the projection unit 13 and the sensor 12. For example, the countersink diameter and/or the hole diameter can be identified. Here, a countersink depth T for the drilled hole of the machining point B is identified from the countersink diameter and information relating to the drill used for the drilled hole 11. The tool control data 9a for the drilled hole 11 which is to be subsequently drilled according to the manufacturing specification 10 at the further machining point B—in particular the countersink depth T of the drilled hole 11 to be drilled—can then additionally also be adapted based on the analysis of these detection data.

Provision can additionally or alternatively be made for a pattern, in particular the pattern M, to be projected onto the further machining point $B_1$ by means of the projection unit 13 at the further machining point $B_1$ before the insertion of the rivet element 4 into the drilled hole 11 and for the further machining point $B_1$ with the drilled hole 11 without the inserted rivet element 4, including the projection of the pattern M, to be detected by a sensor, in particular the sensor 12. Additionally, the drilled hole 11 of the further machining point $B_1$ can therefore also be analyzed using the projection unit 13 and the sensor 12. For example, the countersink diameter and/or the hole diameter can be identified. Here, a countersink depth T is identified from the countersink diameter and information relating to the drill used for the drilled hole 11 of the further machining point $B_1$. Then, based on the analysis of these detection data 14, drilling can subsequently be carried out again with adapted tool control data 9a, in particular a greater countersink depth T, and/or the tool control data 9a can additionally also be adapted for a further drilled hole 11 which is to be subsequently drilled according to the manufacturing specification 10 at the following machining point $B_2$—in particular the countersink depth T of the drilled hole 11 which is to be drilled—based on the analysis of these detection data 14.

Finally, additional illumination 20 for illuminating the machining point during the projection and detection can be provided. This can increase the detection precision owing to the additional light falling onto the machining point B.

The invention claimed is:

1. A method for machining an aircraft structural component using a machining system, wherein the machining system comprises a drilling unit and a riveting unit, wherein a manufacturing process control for activating components of the machining system is provided, wherein the manufacturing process control executes a series of drilling procedures by the drilling unit and riveting procedures by the riveting unit based on tool control data according to a manufacturing specification, wherein the machining system comprises an optical sensor and a projection unit, wherein the method comprises:

drilling a hole into an aircraft structural component at a machining point and inserting a rivet element into the drilled hole, projecting a pattern, using the projection unit, onto the machining point with the rivet element inserted into the drilled hole, detecting the machining point, including the projection of the pattern, using the optical sensor and generating corresponding detection data by the sensor, analyzing the detection data by an analysis unit, wherein the manufacturing process control adapts the tool control data for a drilled hole which is to be subsequently drilled, and drills the to be subsequently drilled hole according to the manufacturing specification at a further machining point by the manufacturing process control based on the analysis of the detection data.

2. The method as claimed in claim 1, wherein a head projection of the rivet element is determined during the analysis, and/or wherein an angled position of the rivet element is determined during the analysis.

3. The method as claimed in claim 1, wherein the pattern comprises at least one stripe.

4. The method as claimed in claim 3, wherein there are more than one stripes and the at least one stripe is wider or narrower than another stripe and/or a mutual distance between the one or more stripes differs.

5. The method as claimed in claim 1, wherein the pattern consists exclusively of parallel stripes or wherein the pattern consists of a predetermined point cloud or wherein the pattern is a grid pattern.

6. The method as claimed in claim 2, wherein, at the machining point, the head projection is determined by identifying an offset of the pattern on the head of the rivet element in relation to the pattern at the machining point or with respect to a reference.

7. The method as claimed in claim 1, wherein, at the machining point, an angled position of the rivet element can be determined by identifying a rotation of the pattern on the head of the rivet element with respect to the pattern on the aircraft structural component at the machining point or with respect to a reference and/or by identifying a compression or elongation of the pattern on the head of the rivet element in relation to the pattern at the machining point or with respect to a reference.

8. The method as claimed in claim 1, wherein, during the detection of the machining point, the projection unit and the sensor are directed onto this machining point at an angle to one another.

9. The method as claimed in claim 1, wherein, during the detection, the projection unit is directed onto the machining point at an angle in relation to the longitudinal axis of the drilled hole.

10. The method as claimed in claim 1, wherein, during the detection, the sensor is directed onto the machining point from above.

11. The method as claimed in claim 1, wherein the analysis and the adaptation is based on the detection data which are generated when the rivet element is inserted and the rivet connection is not yet produced, and/or in that the analysis and the adaptation is based on detection data which are generated when the rivet element is inserted and a rivet connection is already produced.

12. The method as claimed in claim 1, wherein the method is repeated at the further machining point as a new machining point and the machine tool data are adapted for a machining point following this new machining point.

13. The method as claimed in claim 1, wherein the manufacturing process control detects whether the rivet belongs to the same batch as the rivet element inserted at the machining point or whether it belongs to a new batch.

14. The method as claimed in claim 2, wherein, based on this analysis, the countersink depth is adapted in the tool control data for the drilled hole which is to be subsequently drilled.

15. The method as claimed in claim 3, wherein the pattern is a striped projection having at least two stripes.

16. The method as claimed in claim 5, wherein the grid pattern comprises a plurality of polygons.

17. The method as claimed in claim 13, wherein, if the rivet element which is to be inserted at the further machining point belongs to a new batch, the method is repeated at the further machining point as a new machining point and the tool control data are adapted for a machining point following this new machining point.

\* \* \* \* \*